(No Model.)
W. BOURKE.
BUTTON.
No. 547,060. Patented Oct. 1, 1895.
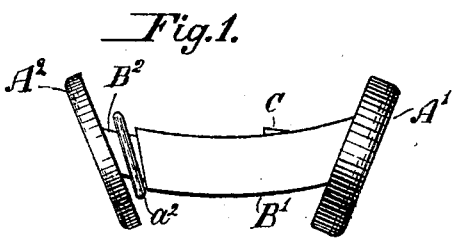
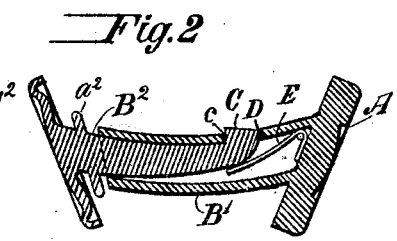
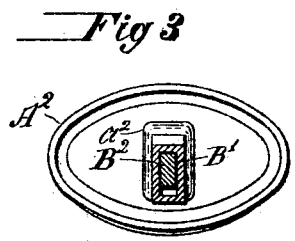
WITNESSES:
Pierson L. Wells.
Jac Klemann Jr.
INVENTOR,
William Bourke,
BY Edwin H. Brown,
HIS ATTORNEY.

UNITED STATES PATENT OFFICE.

WILLIAM BOURKE, OF NEW YORK, N. Y.

BUTTON.

SPECIFICATION forming part of Letters Patent No. 547,060, dated October 1, 1895.

Application filed December 31, 1894. Serial No. 533,384. (No model.)

*To all whom it may concern:*

Be it known that I, WILLIAM BOURKE, of the city, county, and State of New York, have invented a certain new and useful Improvement in Buttons, of which the following is a specification.

My improvement relates particularly to buttons of the kind made and sold by jewelers for securing a garment having buttonholes in two opposite edges.

My button consists in a combination of two heads, a tubular or hollow shank connected with one and a shank connected with the other and made so as to be capable of entering the tubular or hollow shank of the first-mentioned head, the said shanks being so combined as to permit of a rocking motion of one relatively to the other, and one being provided with a detent for engaging a catch in the other. Preferably there will be a spring for resisting the relative rocking motion of the two shanks.

I will describe in detail a button embodying my invention, and then point out the novel features in a claim.

In the accompanying drawings, Figure 1 is a side view of a button embodying my improvement. Fig. 2 is a central longitudinal section of the same. Fig. 3 is a transverse section of the same.

Similar letters of reference designate corresponding parts in all the figures.

$A'$ $A^2$ designate two heads which may be of any suitable material and form. By the term "head" in this connection I wish to include what is ordinarily termed a "shoe" or "back plate" as well as what is more particularly termed a "head," and generally to include any two parts analogous to heads.

The head $A'$ has a tubular shank $B'$, and this, in the present example of my improvement, is made rectangular in form. Any suitable material may be employed in its construction. Metal, of course, will be more suitable than any other.

The head $A^2$ is provided with a shank $B^2$. As the shank $B'$ is made rectangular in this example of my invention, the shank $B^2$ is similarly formed. At or near the end where it is attached to the head $A^2$ the shank $B^2$ is made of a size to substantially fill the outer end of the shank $B'$ belonging to the head $A'$, but from this point toward the outer end the shank $B^2$ tapers longitudinally. Near its outer extremity it is provided with a detent C, here shown as made in the form of a hook having a V-shaped notch or recess $c$.

The shank $B'$ is provided with a catch D, which, as here shown, consists of an opening extending transversely through one of the narrow walls of this shank. This catch is of a size and occupies a position adapting it to engage the detent C.

Owing to the longitudinal tapering of the shank $B^2$, it may rock within the shank $B'$ sufficiently to permit of the engagement and disengagement of the detent C from the catch D.

A spring E will preferably be employed for causing the detent to engage with the catch and for normally holding the two parts in engagement, and this may most advantageously be fastened inside of the shank $B'$.

While I do not wish to be confined to any particular form of spring, the spring E, which I have shown as consisting of a longitudinally-bent strip of flat metal, is a convenient form.

Preferably there will be a collar $a^2$ upon the shank $B^2$.

It will be seen that by my improvement I have produced a button having two heads, two shanks interlocking with each other, so as to prevent independent rotary motion, a detent on the one, a catch on the other, and means permitting of a rocking motion for engaging and disengaging the catch and detent. This will be found a very convenient form of button and particularly well adapted as a substitute for the ordinary link-stud.

Instead of rocking the shanks relatively to each other by force applied to the heads, the detent may be disengaged from the catch by pressing inward the protruding end of the detent, when the detent is made to protrude as in the drawings.

What I claim as my invention, and desire to secure by Letters Patent, is—

A button having two heads, a tubular or hollow shank extending from one, a shank extending from the other and capable of introduction into the tubular or hollow shank of the first, and made longitudinally tapering so as to be capable of rocking, a catch on one shank, a detent on the other shank, and a spring, substantially as specified.

In testimony whereof I have signed my name to this specification in the presence of two subscribing witnesses.

WILLIAM BOURKE.

Witnesses:
ANTHONY GREF,
R. LAWSON.